United States Patent
Zhang et al.

(10) Patent No.: US 10,778,374 B2
(45) Date of Patent: Sep. 15, 2020

(54) FEEDBACK FOR CONTINUOUS CB TRANSMISSIONS

(71) Applicant: Nokia Technologies Oy, Espoo (FI)

(72) Inventors: Yanji Zhang, Beijing (CN); Chunli Wu, Beijing (CN); Yuantao Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/345,013

(22) PCT Filed: Oct. 31, 2017

(86) PCT No.: PCT/FI2017/050750
§ 371 (c)(1),
(2) Date: Apr. 25, 2019

(87) PCT Pub. No.: WO2018/083380
PCT Pub. Date: May 11, 2018

(65) Prior Publication Data
US 2019/0280821 A1   Sep. 12, 2019

Related U.S. Application Data

(60) Provisional application No. 62/416,917, filed on Nov. 3, 2016.

(51) Int. Cl.
*H04W 4/00*    (2018.01)
*H04L 1/16*    (2006.01)
(Continued)

(52) U.S. Cl.
CPC .......... *H04L 1/1657* (2013.01); *H04L 1/1614* (2013.01); *H04W 28/04* (2013.01);
(Continued)

(58) Field of Classification Search
None
See application file for complete search history.

(56) References Cited

U.S. PATENT DOCUMENTS

2010/0014434 A1* 1/2010 Reznik .................. H04L 1/0026
370/242
2012/0201219 A1* 8/2012 Wager ................... H04L 1/1812
370/329

(Continued)

FOREIGN PATENT DOCUMENTS

WO    2014/047918 A1   4/2014
WO    2015/122701 A1   8/2015

OTHER PUBLICATIONS

"3rd Generation Partnership Project; Technical Specification Group Radio Access Network; Study on Scenarios and Requirements for Next Generation Access Technologies;(Release 14)", 3GPP TR 38.913 V14.0.0, Oct. 2016, pp. 1-39.
International Search Report arid Written Opinion received for corresponding Patent Cooperation Treaty Application No. PCT/FI2017/050750, dated Feb. 2, 2018, 20 pages.

*Primary Examiner* — Clemence S Han
(74) *Attorney, Agent, or Firm* — Harrington & Smith

(57) ABSTRACT

A method is provided including receiving, by a user equipment from a wireless network, an indication of a plurality of contention based transmission occasions and a monitoring window size that the user equipment monitors for feedback for the contention based transmission; determining, by a user equipment of a wireless network, whether an amount of user data can be transmitted on one or more of contention based transmission occasions; performing one or more contention based transmissions during the one or more of the contention based transmission occasions based at least on the determination; and monitoring for feedback for each of the performed contention based transmissions based at least on the monitoring window size, wherein the feedback (Continued)

includes feedback for each contention based transmission in a feedback mapping window.

21 Claims, 8 Drawing Sheets

(51) Int. Cl.
 *H04W 28/04* (2009.01)
 *H04W 74/00* (2009.01)
 *H04W 74/08* (2009.01)
(52) U.S. Cl.
 CPC ......... *H04W 74/002* (2013.01); *H04W 74/08* (2013.01); *H04W 74/0825* (2013.01)

(56) References Cited

U.S. PATENT DOCUMENTS

| | | | |
|---|---|---|---|
| 2012/0213196 A1 | 8/2012 | Chung et al. | |
| 2012/0243486 A1* | 9/2012 | Zeira | H04W 72/005 370/329 |
| 2013/0279465 A1* | 10/2013 | Timner | H04W 74/006 370/329 |
| 2016/0183309 A1* | 6/2016 | Zhang | H04W 52/50 370/329 |
| 2019/0081764 A1* | 3/2019 | Guan | H04L 5/1438 |
| 2019/0090277 A1* | 3/2019 | Yi | H04W 76/27 |

* cited by examiner

US 10,778,374 B2

FEEDBACK FOR CONTINUOUS CB TRANSMISSIONS

RELATED APPLICATION

This application was originally filed as PCT Application No. PCT/FI2017/050750 on Oct. 31, 2017, which claims priority from U.S. Application No. 62/416,917 filed on Nov. 3, 2016.

TECHNICAL FIELD

This invention relates generally to wireless communications and, more specifically, relates to feedback for continuous contention based (CB) transmissions.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

Transmission in wireless networks can be contention based (CB) or contention free (CF). CB transmission refer to transmissions where different user equipments are allowed to use the same radio channel without pre-coordination, and these types of transmission carry an inherent risk of collisions. 3GPP LTE uses a contention free uplink data transmission which is may not be as efficient for small UL packet transmissions as compared to CB transmissions due to, for example, the relatively higher signalling overhead that is required.

BRIEF SUMMARY

This section is intended to include examples and is not intended to be limiting.

In an example of an embodiment, a method is disclosed that includes receiving, by a user equipment from a wireless network, an indication of a plurality of contention based transmission occasions and a monitoring window size that the user equipment monitors for feedback for the contention based transmission; determining, by a user equipment of a wireless network, whether an amount of user data can be transmitted on one or more of contention based transmission occasions; performing one or more contention based transmissions during the one or more of the contention based transmission occasions based at least on the determination; and monitoring for feedback for each of the performed contention based transmissions based at least on the monitoring window size, wherein the feedback comprises feedback for each contention based transmission in a feedback mapping window.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

In another example of an embodiment, an apparatus comprises means for receiving, by a user equipment from a wireless network, an indication of a plurality of contention based transmission occasions and a monitoring window size that the user equipment monitors for feedback for the contention based transmission; means for determining, by a user equipment of a wireless network, whether an amount of user data can be transmitted on one or more of contention based transmission occasions; means for performing one or more contention based transmissions during the one or more of the contention based transmission occasions based at least on the determination; and means for monitoring for feedback for each of the performed contention based transmissions based at least on the monitoring window size, wherein the feedback comprises feedback for each contention based transmission in a feedback mapping window.

An additional example of an embodiment includes an apparatus comprising at least one processor; and at least one non-transitory memory including computer program code, the at least one memory and the computer program code configured to, with the at least one processor, cause the apparatus at least to: receive, by a user equipment from a wireless network, an indication of a plurality of contention based transmission occasions and a monitoring window size that the user equipment monitors for feedback for the contention based transmission; determine, by a user equipment of a wireless network, whether an amount of user data can be transmitted on one or more of contention based transmission occasions; perform one or more contention based transmissions during the one or more of the contention based transmission occasions based at least on the determination; and monitor for feedback for each of the performed contention based transmissions based at least on the monitoring window size, wherein the feedback comprises feedback for each contention based transmission in a feedback mapping window.

In an example of an embodiment, a method is disclosed that includes configuring, by a base station, a plurality of contention based transmission occasions for a plurality of user equipments, and a monitoring window size to be used by the plurality of user equipments to monitor for feedback of contention based transmissions; receiving, from at least one of the user equipments, one or more contention based transmission corresponding to one or more of the contention based transmission occasions; generating feedback for the received one or more contention based transmissions, wherein the feedback comprises feedback for each contention based transmission received in a feedback mapping window having the configured window size; and transmitting the feedback to the plurality of user equipments.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

In another example of an embodiment, an apparatus comprises means for configuring, by a base station, a plurality of contention based transmission occasions for a plurality of user equipments, and a monitoring window size to be used by the plurality of user equipments to monitor for feedback of contention based transmissions; receiving, from at least one of the user equipments, one or more contention based transmission corresponding to one or more of the contention based transmission occasions; generating feedback for the received one or more contention based transmissions, wherein the feedback comprises feedback for each contention based transmission received in a feedback mapping window having the configured window size; and transmitting the feedback to the plurality of user equipments.

An additional example of an embodiment includes an apparatus comprising at least one processor; and at least one non-transitory memory including computer program code, the at least one memory and the computer program code configured to, with the at least one processor, cause the apparatus at least to: configure, by a base station, a plurality of contention based transmission occasions for a plurality of user equipments, and a monitoring window size to be used by the plurality of user equipments to monitor for feedback of contention based transmissions; receive, from at least one of the user equipments, one or more contention based transmission corresponding to one or more of the contention based transmission occasions; generate feedback for the received one or more contention based transmissions, wherein the feedback comprises feedback for each contention based transmission received in a feedback mapping window having the configured window; and transmit the feedback to the plurality of user equipments.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for feedback for continuous CB transmissions. Additional description of these techniques is presented after a system into which the exemplary embodiments may be used is described.

Figure 1:
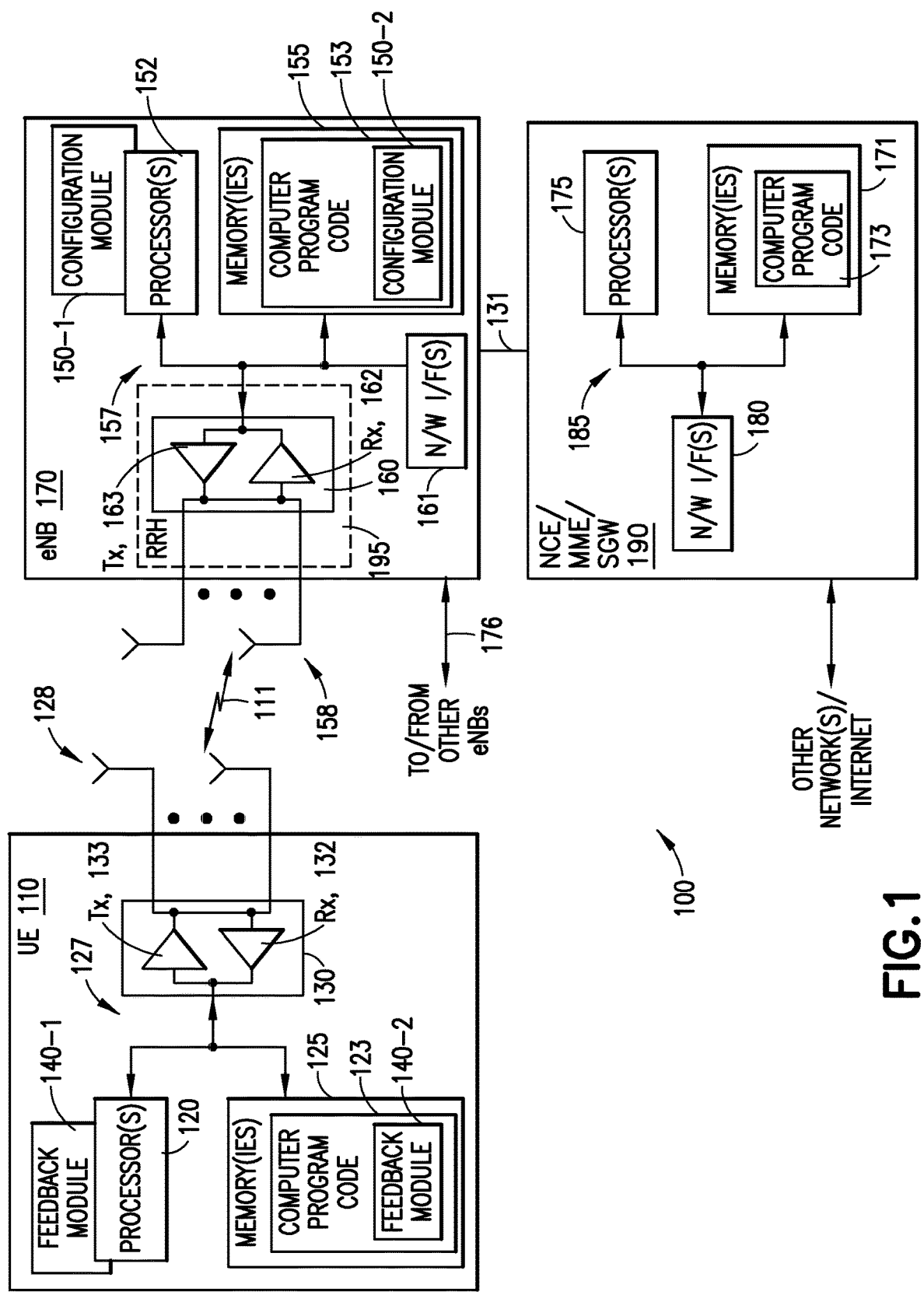
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. It is noted that aspects of FIG. 1 are described using LTE terms, however this is not intended to be limiting. For example, eNB 170 is also representative of a gNB (the presumed designation for a base station in a NR (5G) wireless network). In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a feedback module 140, comprising one of or both parts 140-1 and/or 140-2, which may be implemented in a number of ways. The feedback module may be implemented in hardware as feedback module 140-1, such as being implemented as part of the one or more processors 120. The feedback module 140-1 may be implemented also as an integrated circuit or through other hardware such as a programmable gate array. In another example, the feedback module may be implemented as feedback module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a configuration module, comprising one of or both parts 150-1 and/or 150-2, which may be implemented in a number of ways. The configuration module may be implemented in hardware as configuration module 150-1, such as being implemented as part of the one or more processors 152. The configuration module 150-1 may be implemented also as an integrated circuit or through other hardware such as a programmable gate array. In another example, the configuration module may be implemented as configuration module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

It is noted that description herein indicates that "cells" perform functions, but it should be clear that the eNB that forms the cell will perform the functions. The cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

A new study item was agreed at RAN#71 where the main objective aims to develop a New Radio Access Technology (N-RAT) where "Target a single technical framework addressing all usage scenarios, requirements and deployment scenarios defined in TR38.913 including, Enhanced mobile broadband, Massive machine-type-communications, Ultra reliable and low latency communications". The new radio access technology enables a diverse and wide range of services, which needs to deliver high throughput, connect numerous of devices or terminals, and provide immediate feedback on demand.

RAN2 #94 agreed to study the introduction of a RAN controlled "state", during which UEs should incur minimum signaling, minimize power consumption, minimize resource costs in the Radio Access Network/Core Network (RAN/CN), making it possible to maximize the number of UEs utilizing, and benefiting from, this state. Within this RAN controlled "state", the CN and RAN connection may be maintained, the Access Stratum (AS) context is stored in the RAN and no dedicated resources may be available for the UE. The UE's location is known to network within an area and UE performs mobility within that area without notifying the network.

RAN1 agreed that New Radio (NR) should target to support UL "autonomous/grant-free/contention based" at least for massive Machine-Type-Communication (mMTC), and RAN2#95 discussed one option where a UE in this "new state" would always move to the "full connected state" when there is a need to transmit data (Option A), and second option where the UE could remain in the "new state" even though some data needs to be transmitted (Option B). The discussion result shows the "autonomous/grant-free/contention based" UL transmission is a candidate scheme for data transmissions in this new state.

In LTE, a random access response (RAR) for a random access channel (RACH) is for a certain physical RACH (PRACH) resource for a certain transmission time interval TTI. The RAR message can only contain a single response for each UE mapping to the RA radio network temporary identifier (RA-RNTI) corresponding to the PRACH resource, and thus does not cover a multiple subframe response in one RAR for each single UE. In a CB UL transmission scheme, a UE may transmit UL CB data continuously without receiving feedback from a 5G NR base station (commonly referred to as a 'gNB') in order to reduce data transmission latency. Exemplary techniques described herein relate to how to send feedback to indicate the UL CB data transmission status for continuous CB UL transmissions.

Exemplary embodiments herein relate to providing feedback for the continuous UL CB transmission for next generation wireless network, such as 5$^{th}$ Generation (5G) wireless networks for example.

According to exemplary embodiments, a gNB may preconfigure resources for a UE for CB transmission. For instance, the gNB may provide time/frequency domain resources, the modulation and coding scheme (MCS) and the transport block size (TBS) for CB transmission. Additionally, the maximum allowed number of continuous CB transmission may be configured/broadcasted by the gNB.

When a UE has UL data to be sent, the UE first checks whether a CB transmission is allowed based on the preconfiguration, e.g. if amount of data to be sent is less than the TBS multiplied by the maximum allowed number of continuous CB transmissions then the UE may initiate the CB transmission from the preallocated CB resource.

Figure 2:
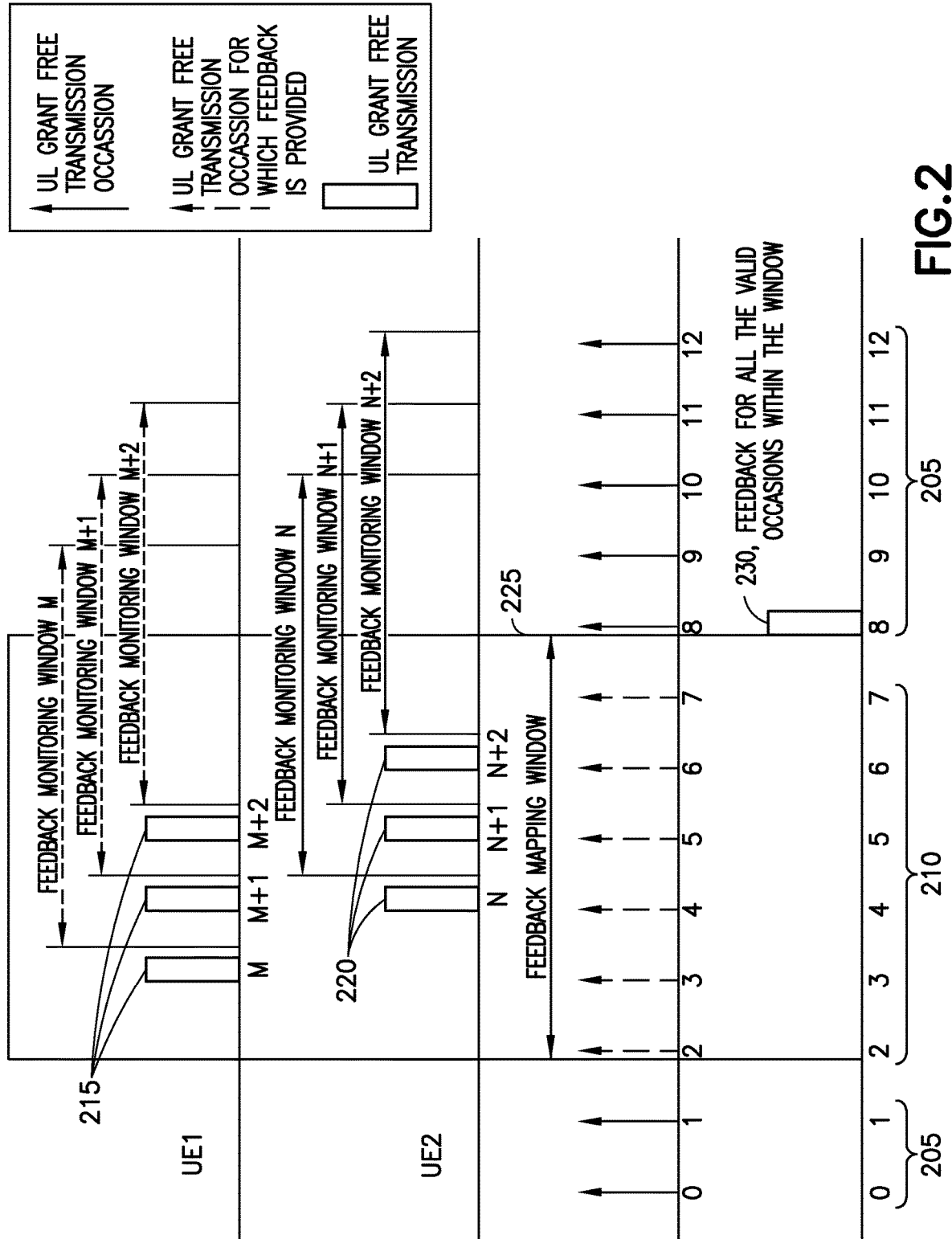
FIG. 2 is an example diagram showing a relationship of UL CB transmissions and feedback for the CB UL data transmissions in accordance with exemplary embodiments.

The UE sends the UL data from the preconfigured CB transmission occasion continuously, and begins monitoring downlink (DL) feedback for a number of subframes (e.g. X subframes) i.e. monitoring the feedback during the feedback monitoring window as shown in FIG. 2 (X=6), K subframes after the subframe where the UL CB transmissions (K=1). The DL feedback indicates the status of each occasion within the feedback mapping window by a bitmap. For example, the indication maps to the occasion within the feedback mapping window starting from the first/leftmost valid bit in the bitmap. The first/leftmost valid bit is determined based on the maximum allowed continuous CB transmissions.

Optionally, the DL feedback may include at least some of the following information depending on the CB data transmission status in gNB:
the preamble detected;
the UE-ID decoded from the UL CB data;
the UL timing advance (TA);
the UL Grant; and
the temporary C-RNTI.

Referring now to FIG. 2, this figure illustrates an example showing the relationship of UL CB transmissions and feedback for the CB UL data transmissions in accordance with exemplary embodiments. In this example, there are multiple UL grant free transmission occasions, which are numbered 0-12. The UL grant free transmission occasions 210 (represented by the lighter arrows in FIG. 2) corresponds to UL grant free transmission occasions for which feedback is provided within the feedback monitoring window. The UL grant free transmission occasions 205 (represented by the darker arrows) are UL grant free transmission occasions which are outside the feedback mapping window for the feedback received at subframe #8. In this example, it is assumed that the maximum number of continuous CB transmissions is set at 6. In this example, the feedback monitoring window and feedback mapping window corresponds to 6 subframe. The DL Feedback 230 indicates the status of each occasion within the feedback mapping window 225. The structure of how the DL Feedback 230 is provided to UE 1 and UE 2 is discussed in more detail below with reference to FIGS. 3A-3B and 4A-4B.

In the example shown in FIG. 2, UE 1 sends three UL grant free transmissions 215 at occasions 3-5. In particular, UE 1 sends preamble #1 from occasion 3, preamble #2 from occasion 4, and preamble #3 from occasion 5. UE 2 also sends three UL grant free transmissions 220 at occasions 4-6. In particular, UE 2 sends preamble #3 from occasion 4, preamble #4 from occasion 5, and preamble #5 from occasion 6. The DL feedback provides feedback for all occasions transmitted in the feedback mapping window. And the DL feedback is transmitted K subframes after the subframe for which it is providing feedback. The DL Feedback 230 is transmitted, for example by a gNB, around occasion #8 (i.e., K=1), and the DL Feedback 230 is capable of providing feedback for the occasions from 2 to 7. UE 1 monitors for DL feedback for the UL grant free transmission M (sent at occasion 3) during feedback monitoring window M, for the UL grant free transmission M+1 during feedback monitoring window M+1, etc. Similarly, UE 2 monitors for DL feedback for the UL grant free transmission N during feedback monitoring window N, for the UL grant free transmission N+1 during feedback monitoring window N+1, etc. Thus, UE 1 receives the DL feedback 230 maps to occasions 3, 4, and 5, UE 2 receives the DL feedback 230 maps to occasions 4, 5, and 6.

Feedback Structure—Option 1

According to some embodiments a first feedback structure (referred to herein as, option 1) is utilized for DL Feedback (e.g. DL Feedback 230 of FIG. 2). According to option 1, the DL feedback indicates a list of preambles detected or the UE-ID decoded from the user data followed, and for each preamble or UE-ID, a bitmap indicates the CB transmission is received in the corresponding occasion within the feedback mapping window.

The UE checks if the preamble or the UE-ID is sent from itself, and then checks from the occasion where this preamble or UE-ID is sent in the bitmap. Value of 1 indicates that the CB transmission with this preamble or UE-ID is detected or decoded from this occasion.

If the UE detects the indication for its CB data transmission from the corresponding occasion, it then will decode the corresponding field in each entry associated with the preamble or the UE-ID.

Figure 3A:
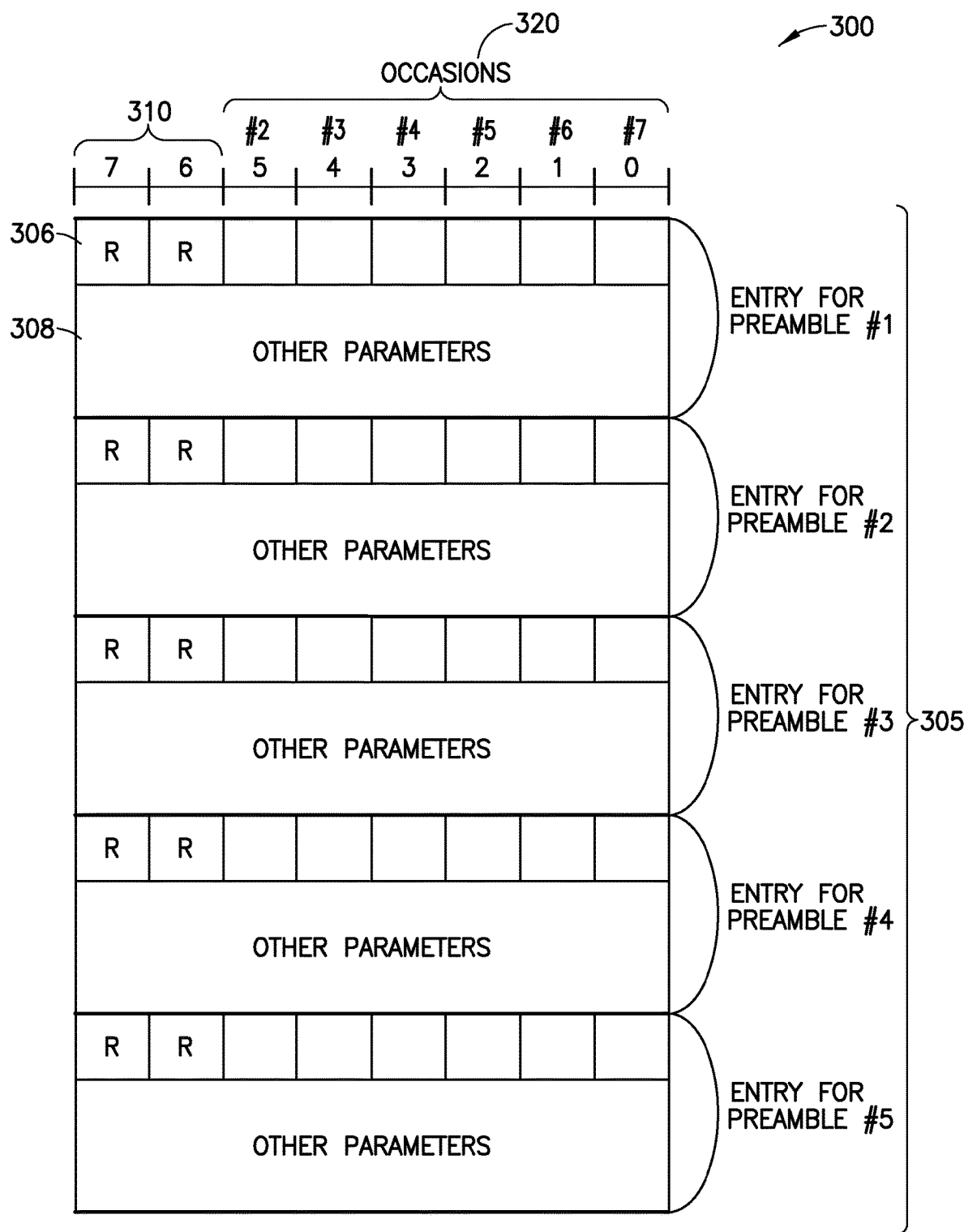
FIG. 3A figure shows a simplified high-level feedback structure in accordance in accordance with the exemplary embodiments.

Referring now to FIG. 3A, this figure shows an example high-level feedback structure 300 in accordance with the exemplary embodiments. The example feedback structure 300 is in accordance with feedback structure option 1. In this example, the feedback structure 300 includes five entries 305 corresponding to preambles #1-#5, respectively. It should be understood that the number of entries is not intended to be limiting, and more or less entries may be used. Each of the entries 305 includes a bitmap section 306 and a parameters section 308. Although not shown, the entries 305 may also include a section indicates the entry corresponds to a specific preamble ID or UE ID. The bitmap section 306 indicates whether the preamble (or UE-ID) for a given entry was successfully received for each of the respective transmission occasions. In this example the bitmap section 306 includes two ('R') bits 310 with only 6 bits needed for the feedback bitmap with 6 occasions within the feedback mapping window. In this example, the six bits 320 correspond to the bitmap and indicate which occasions (i.e. occasions #2-#7) the preamble was successfully received. The parameters section 308 may include UL TA, UL Grant, temporary C-RNTI, the preamble the UE selected during CB transmission; or the UE-ID carried in the data part of the contention based transmission.

Figure 3B:
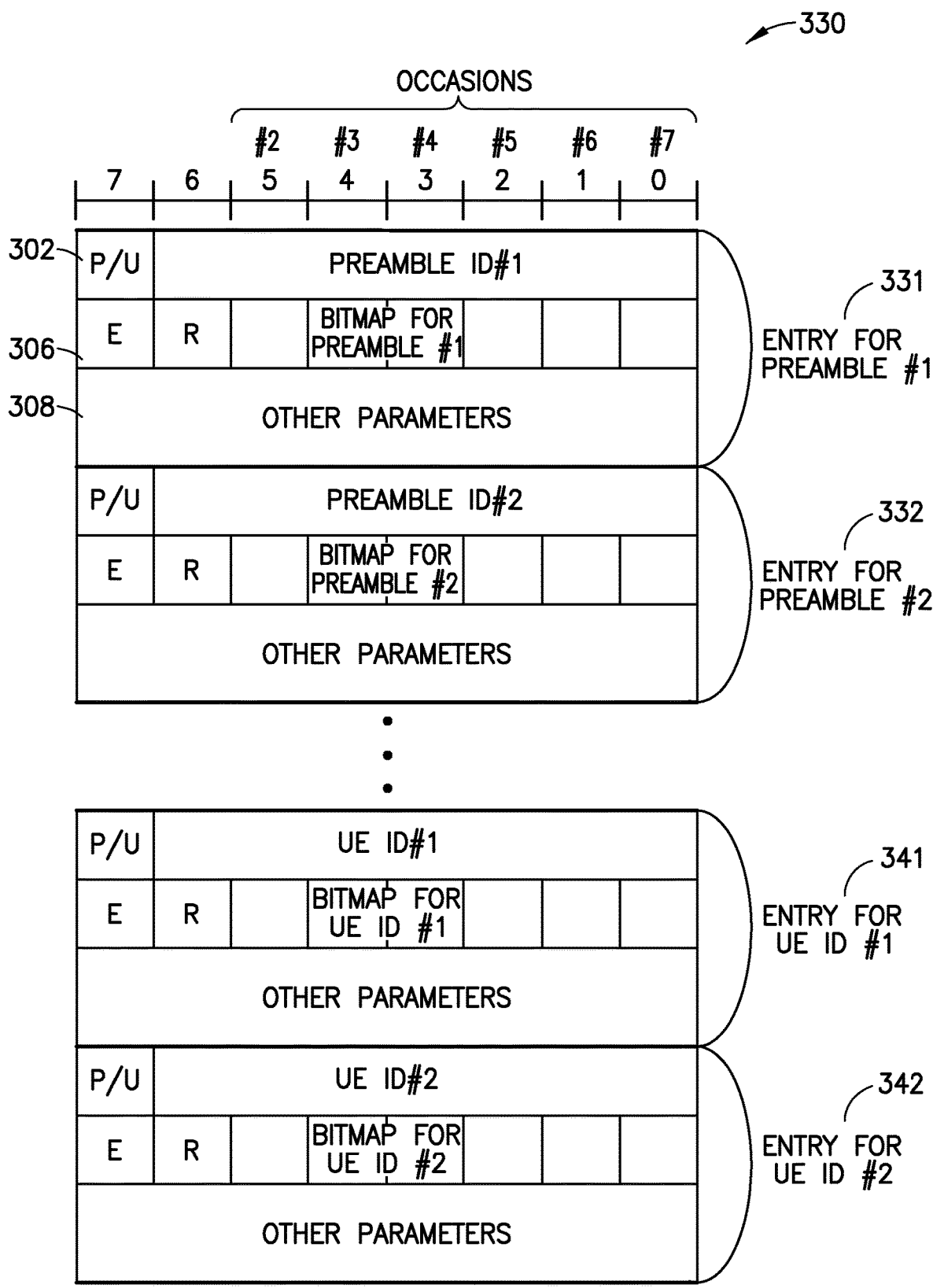
FIG. 3B shows a detailed example according to the structure shown in FIG. 3A.

Referring also to FIG. 3B, this figure shows example feedback 330 corresponding to the structure 300 shown in FIG. 3A. For simplicity, FIG. 3B includes four entries 331, 332, 341, 342, but it should be understood that more, or less, entries are possible according to the number of determined preambles/UE-IDs from transmissions received by, for example, a gNB. It should also be understood that the order of the entries shown in FIG. 3B is merely exemplary, and it is also possible the feedback structure may include entries corresponding only to UE-IDs, only to preamble IDs, or a mix of UE-ID entries and preamble entries. In FIG. 3A, entries 331 and 332 correspond to preamble #1 and preamble #2, respectively. Entries 341 and 342 correspond to UE ID #1 and #2, respectively. The entries may be identified by section 302 of each of the respective entries. Bit #7 indicates whether the entry is for a preamble or a UE-ID, and bits #6-0 indicate the specific UE-ID or preamble to which the entry corresponds. In this example, bitmap section 306 includes an 'E' bit at bit #7 to indicate if more entries follow.

For example, assume UE 1 from FIG. 2 receives the feedback 330 shown in FIG. 3B. In FIG. 2, UE 1 sent preamble #1 from occasion 3, preamble #2 from occasion 4, and preamble #3 from occasion 5. Therefore, when UE 1 receives the feedback 330, UE 1 checks:

bit #4 from entry for preamble #1/UE ID #1;
bit #3 from entry for preamble #2/UE ID #1; and
bit #2 from entry for preamble #3/UE ID#1.
Similarly, UE2 checks:
bit #3 from entry for preamble #3/UE ID #2
bit #2 from entry for preamble #4/UE ID #2; and
bit #1 from entry for preamble #5/UE ID #2.

If the UE determines that one of the bits checked in the bitmap has a value of "1", then the preamble/UE ID was successfully detected, and then the UE will continue the decoding of other parameters. For example, the bitmap for entry 331 may be '010000' (corresponding to bits #5-#0) and thus UE 1 can determine that the transmission on occasion 3 was successfully detected, and then check section 308 for the other parameters. In another example, the bitmap for entry 341 may be '011100', and UE 1 could determine that the gNB successfully detected UE 1's corresponding preamble/UE ID at opportunities #3-5. If UE detects from the bitmap that it includes the feedback for the UL data transmissions it previously sent, it will continue decoding the parameters in the associated entries.

Feedback Structure—Option 2

According to alternative embodiments, a second feedback structure (referred to herein as, option 2) is utilized for DL feedback. For option 2, the DL feedback may use a single bitmap to indicate the CB data transmission status for each occasion within the window. In some examples, a value of zero indicates neither a preamble nor a UE ID is detected; and a value of 1 indicates that the gNB detected a preamble and/or UE ID for a given one of the occasions. If UE sent data from the given occasion, then the UE continues to check whether the feedback is for the user equipment based on the preamble ID or UE-ID.

If preamble is decoded but no data is decoded: the feedback contains the preamble ID and optionally, the UL grant.
If preamble and data are both decoded: the feedback contains the UE-ID and one or more optional fields (UL grant, TA, C-RNTI, etc.).

Figure 4A:
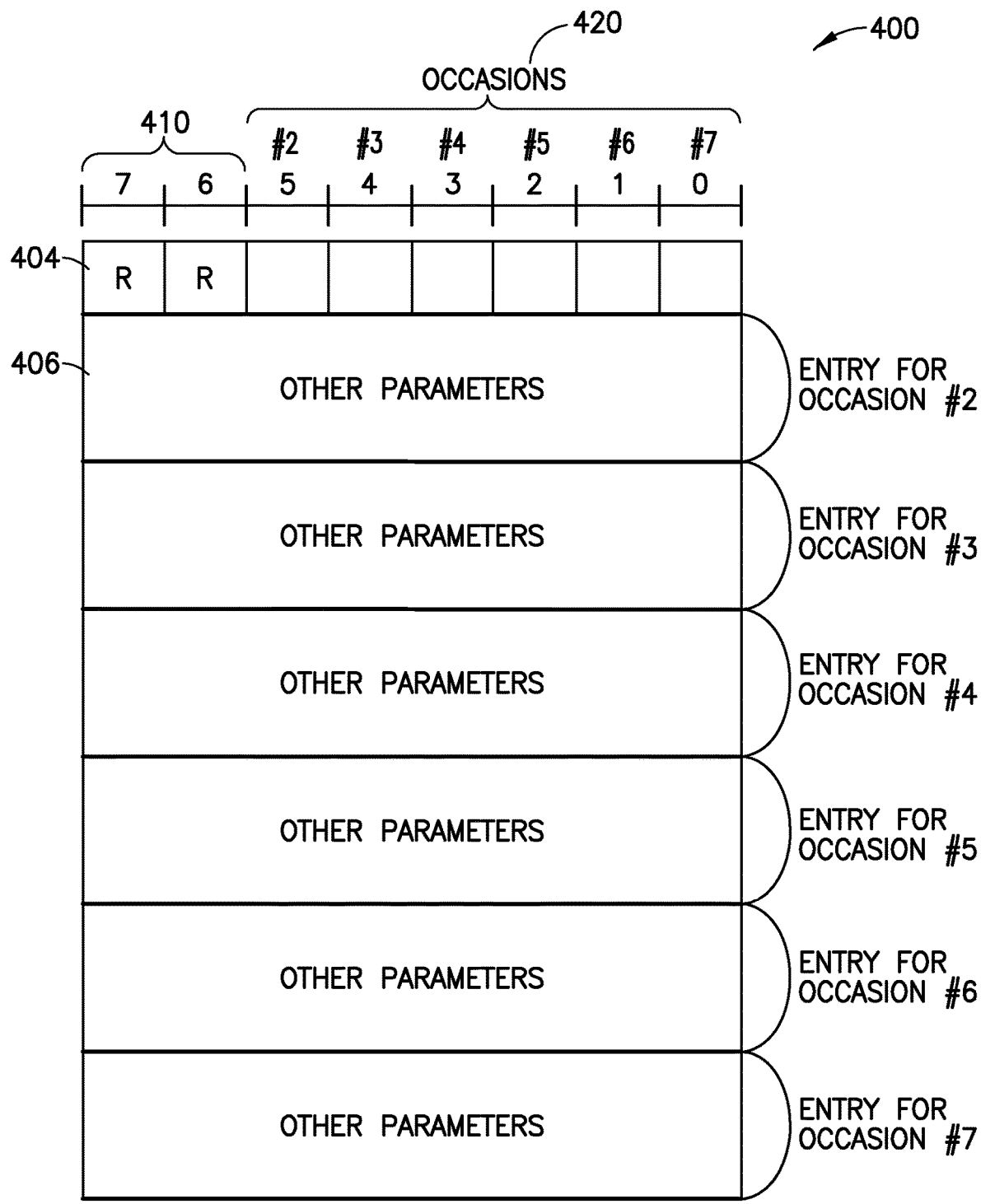
FIG. 4A figure shows another simplified high-level feedback structure in accordance in accordance with the exemplary embodiments.

Referring now to FIG. 4A, this figure shows an example high-level feedback structure 400 in accordance with the exemplary embodiments. The example feedback structure 400 is in accordance with feedback structure option 2 described above. In this example, the feedback structure 400 includes a bitmap section 404, and entries corresponding to each occasion, represented by section 406. The bitmap section 404 includes two reserved ('R') bits 410 with only 6 bits needed for the feedback bitmap with 6 occasions within the feedback mapping window. The feedback bitmap (which in this example is indicated by the six bits 420 for the single bitmap) is used to indicate the CB data transmission status for each occasion.

Figure 4B:
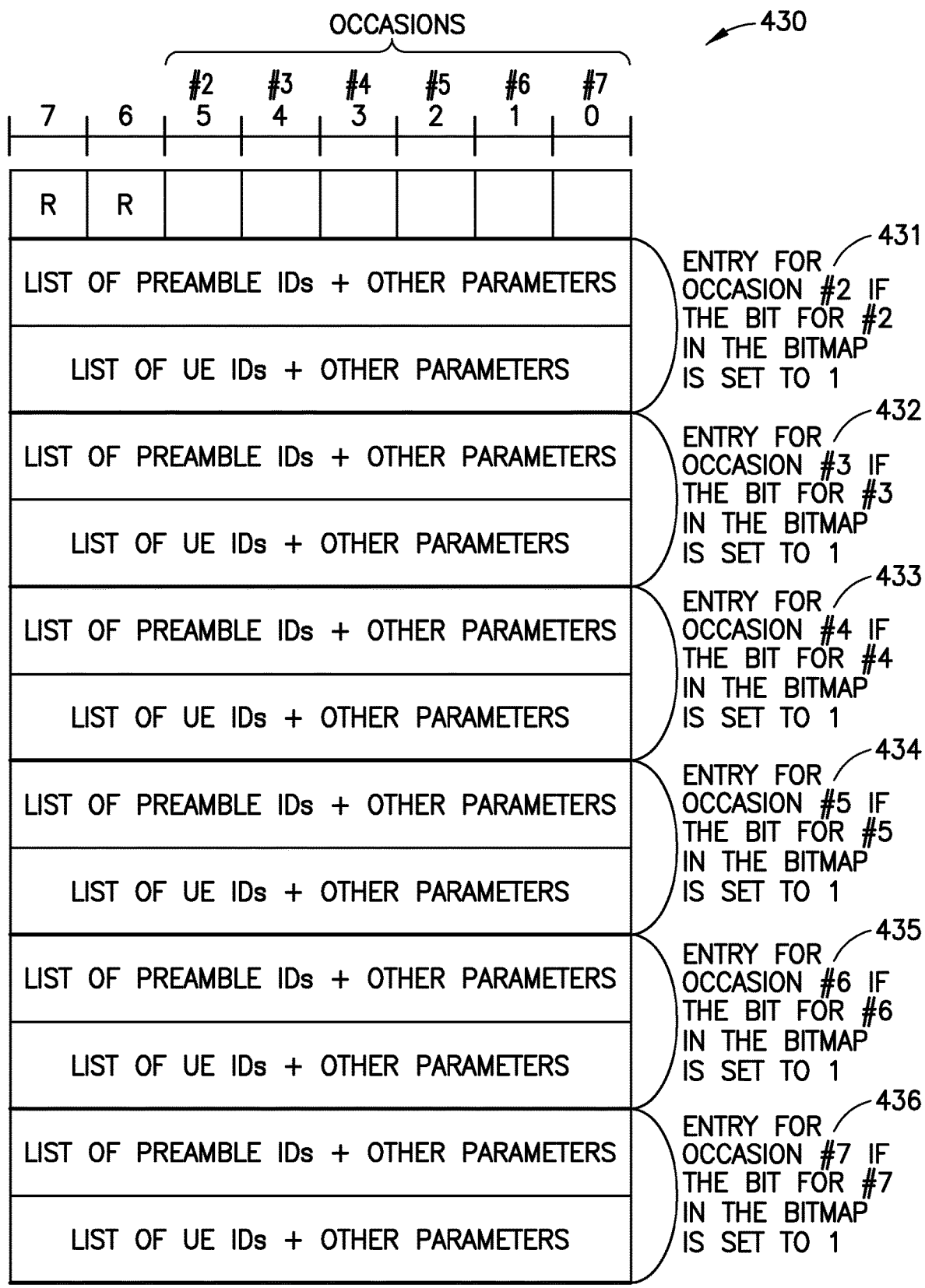
FIG. 4B shows a detailed example according to the structure shown in FIG. 4A.

Referring also to FIG. 4B, this figure shows example feedback 430 according to feedback structure 400 shown in FIG. 4A. In this example, entries 431-436 correspond to occasions #2-#7, respectively. Each of these entries includes a list of preamble IDs and/or a list of UE IDs. If a UE has sent data from one or more of the occasions, then the UE will check the entry corresponding to the one or more occasions to determine whether the feedback is for the UE based on a preamble ID and/or the UE ID from the corresponding entry. The UE may determine whether the gNB detected a preamble ID/UE ID, if the value of a bit is '1', for example.

Assume feedback 430 is provided to UE 1 and UE 2 as the DL feedback 230 from FIG. 2. If UE 1 sent preamble #1 from occasion 3, preamble #2 from occasion 4, and preamble #3 from occasion 5, then UE 1 checks if the bitmap's value at bit #4, #3, and #2 is equal to '1' (i.e. indicating the gNB detected a preamble at those bits). If so, then UE 1 continues to checks entry 432 to determine whether: a list of preamble IDs in entry 432 includes preamble #1 and/or a list of UE IDs includes UE ID1. If so, UE 1 can determine the parameters for that occasion. UE 1 then checks entries 433 and 434 in similar manner. UE 2 determines feedback for occasions According to exemplary embodiments, a number of continuous CB transmissions allowed for UEs, occasions of CB transmission (resources and interval of CB transmission), and a size of the window for monitoring feedback may be preconfigured by a gNB. A UE may determine whether to perform CB transmission based on the maximum number of continuous CB transmissions and the preconfigured TBS. For example, if the data amount in an UL buffer is less than the maximum number of allowed continuous CB transmissions multiplied by the preconfigured TBS, it may initiate the UL CB transmission, otherwise, it will trigger a scheduling request (SR) for a dynamic scheduled UL transmission.

In some examples, a common CB-RNTI is utilized for monitoring the feedback of CB UL transmission. The window for monitoring feedback may start K subframes after sending a CB UL data, where each CB UL transmission is associated with a feedback monitoring window. In some examples, the CB UL transmission feedback may include the feedback for TBs from different UEs, furthermore, it could also provide feedback for multiple TBs sent from the same UE from different CB occasions.

In other examples, CB UL transmission feedback sent from a certain subframe may provide the feedback for every occasion within an associated specific feedback mapping window, namely, it may indicate the status of all the CB transmission occasions regardless of whether any TB from any UE is transmitted in the occasion during a period whose length is defined by the feedback window before the subframe. The CB UL transmission feedback indicates to the UE for a specific subframe: whether a preamble is detected, or whether the preamble is detected and the subsequent data is decoded.

Furthermore, the CB UL transmission feedback may also carry following information depending on the different scenarios: the preamble detected; the UE-ID decoded from the UL CB data; the UL TA; the UL Grant; the temporary C-RNTI. When a UE receives a DL feedback, UE needs to check the indication mapped to each valid occasion and decide the operation followed.

Figure 5:
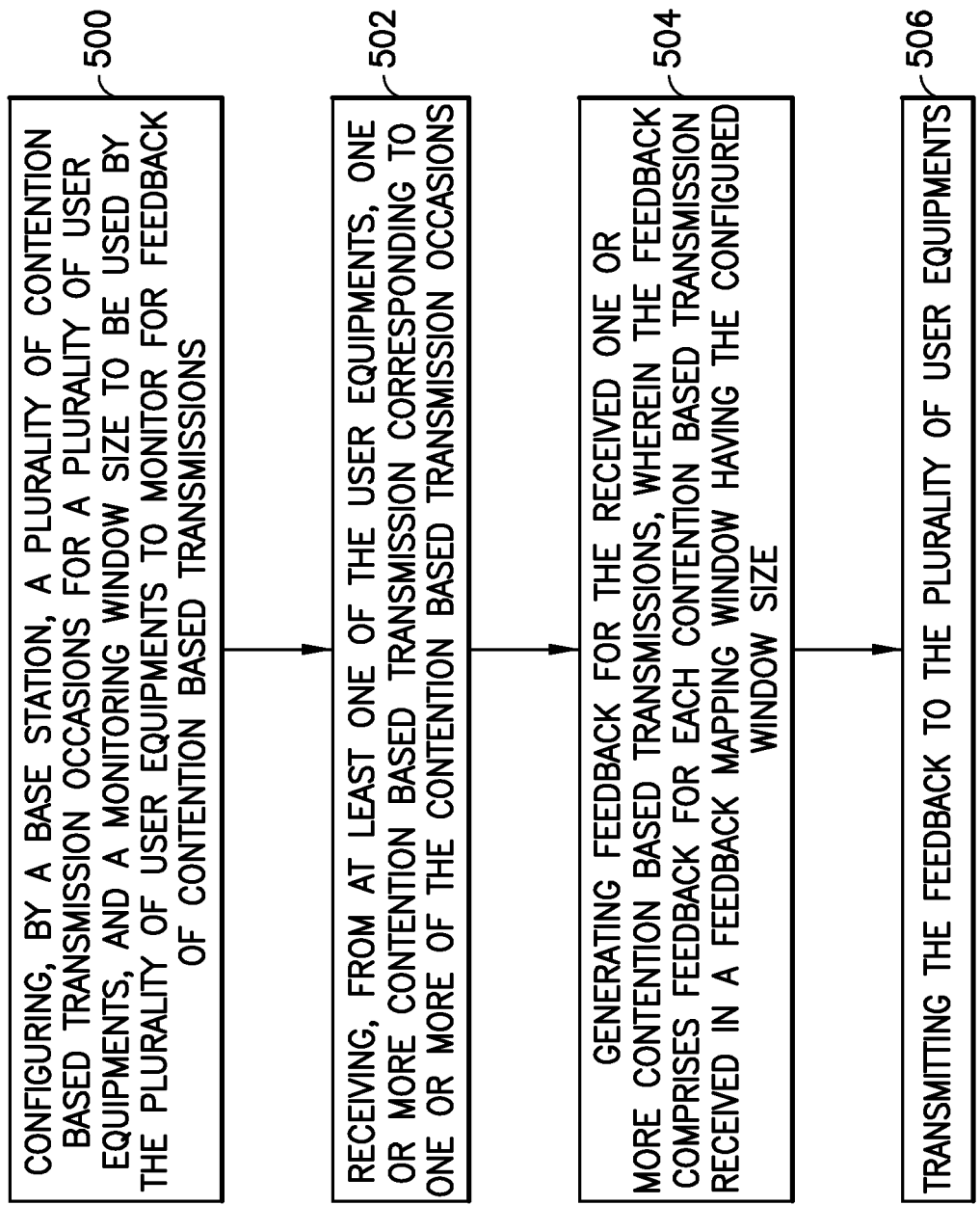
FIGS. 5 and 6 are logic flow diagrams for feedback for continuous CB transmissions, and illustrate the operation of exemplary methods, a result of execution of computer program instructions embodied on a computer readable memory, functions performed by logic implemented in hardware, and/or interconnected means for performing functions in accordance with exemplary embodiments.

FIG. 5 is a logic flow diagram for feedback for continuous CB transmissions. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the configuration module 150-1 and/or 150-2 may include multiples ones of the blocks in FIG. 5, where each included block is an interconnected means for performing the function in the block. The blocks in FIG. 5 are assumed to be performed by a base station such as eNB 170, e.g., under control of the configuration module 150-1 and/or 150-2 at least in part.

In an example embodiment a method is provided, the method comprising: configuring, by a base station, a plurality of contention based transmission occasions for a plurality of user equipments, and a monitoring window size to be used by the plurality of user equipments to monitor for feedback of contention based transmissions as indicated by block 500; receiving, from at least one of the user equipments, one or more contention based transmission corresponding to one or more of the contention based transmission occasions as indicated by block 502; generating feedback for the received one or more contention based transmissions, wherein the feedback may comprise feedback for each contention based transmission received in a feedback mapping window having the configured window size as indicated by block 504; and transmitting the feedback to the plurality of user equipments as indicated by block 506.

The configuring may include configuring a maximum number of consecutive contention based transmission occasions that a given user equipment is allowed to utilize for transmissions.

The feedback may be at least one of: feedback for at least two contention based transmissions received from a same user equipment on different contention based transmission occasions, and feedback for at least two contention based transmissions received from different user equipments.

The at least two contention based transmissions received from different user equipments may be on a same or different contention based transmission occasion within the same feedback mapping window.

The feedback may be transmitted on a specific subframe, and the feedback may include feedback for every contention based transmission occasion within the feedback mapping window.

The feedback for at least one of the contention based transmission occasions may indicate that a contention based transmission was not received during the at least one of the contention based transmission occasions.

A same contention based radio network temporary identifier (CB-RNTI) may be used for transmitting the feedback to each of the plurality of user equipments on a subframe.

The method may further include detecting, by the base station, at least one of: at least one preamble from the received contention based transmissions, and at least one user identifier decoded from user data in the received contention based transmissions; and the feedback may include: at least one list of the detected preambles and/or user identifiers, and at least one bitmap comprising a plurality bits mapped to each of the plurality of contention based transmission occasions.

The at least one bitmap may include a plurality of bitmaps and the at least one list may be a single list, and wherein each of the bitmaps may correspond to a respective preamble and/or user identifier in the list and may be indicative of contention based transmission occasions within which a contention based transmission was received.

The at least one bitmap may be a single bitmap and the at least one list may include a plurality of lists, wherein the single bitmap may be indicative of contention based transmission occasions within which a contention based transmission was received.

According to another embodiment, a computer program comprising program code for executing the method according to any of paragraphs [0056]-[0065] is provided. The computer program may be a computer program product comprising a non-transitory computer-readable medium bearing computer program code embodied therein for use with a computer.

In another example embodiment, an apparatus is provided, comprising: at least one processor; and at least one non-transitory memory including computer program code, the at least one memory and the computer program code may be configured, with the at least one processor, to cause the apparatus at least to: configure, by a base station, a plurality of contention based transmission occasions for a plurality of user equipments, and a monitoring window size to be used by the plurality of user equipments to monitor for feedback of contention based transmissions; receive, from at least one of the user equipments, one or more contention based transmission corresponding to one or more of the contention based transmission occasions; generate feedback for the received one or more contention based transmissions, wherein the feedback may comprise feedback for each contention based transmission received in a feedback mapping window having the configured window size; and transmit the feedback to the plurality of user equipments. The at least one memory and the computer program code may be further configured to, with the at least one processor, cause the apparatus to perform the method according to any of paragraphs [0056]-[0065].

In another example embodiment, an apparatus is provided comprising: means for configuring, by a base station, a plurality of contention based transmission occasions for a plurality of user equipments, and a monitoring window size to be used by the plurality of user equipments to monitor for feedback of contention based transmissions; means for receiving, from at least one of the user equipments, one or more contention based transmission corresponding to one or more of the contention based transmission occasions; means for generating feedback for the received one or more contention based transmissions, wherein the feedback may comprise feedback for each contention based transmission received in a feedback mapping window having the configured window size; and means for transmitting the feedback to the plurality of user equipments. The apparatus may include means for executing the method according to any of paragraphs [0056]-[0065].

Figure 6:
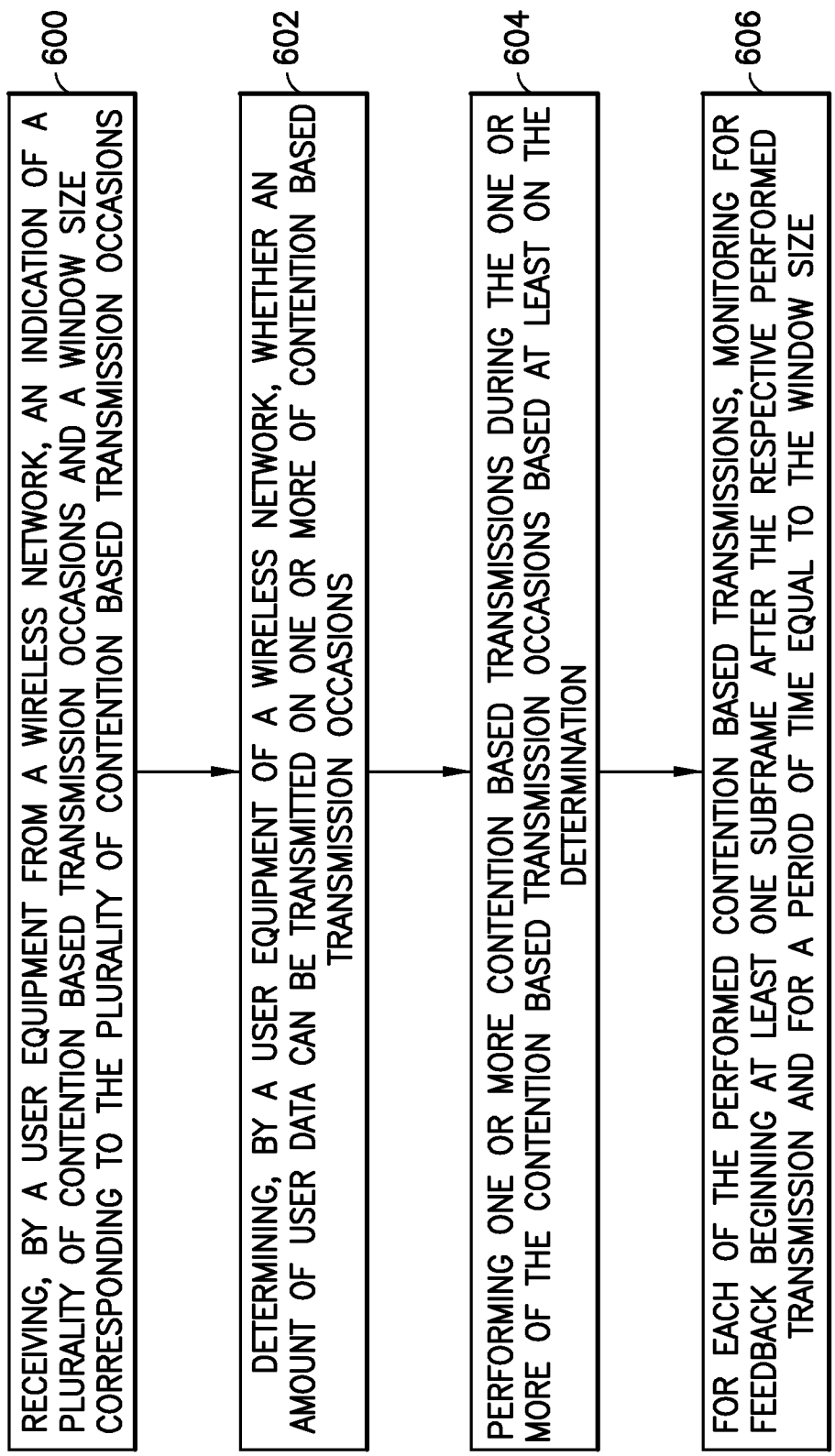

FIG. 6 is a logic flow diagram for feedback for continuous CB transmissions. This figure further illustrates the operation of an exemplary method or methods, a result of execution of computer program instructions embodied on a non-transitory computer readable memory, functions performed by logic implemented in hardware, and/or interconnected means for performing functions in accordance with exemplary embodiments. For instance, the feedback module 140-1 and/or 140-2 may include multiples ones of the blocks in FIG. 6, where each included block is an interconnected means for performing the function in the block. The blocks in FIG. 6 are assumed to be performed by the UE 110, e.g., under control of the feedback module 140-1 and/or 140-2 at least in part.

In another example embodiment a method is provided, the method comprising: receiving, by a user equipment from a wireless network, an indication of a plurality of contention based transmission occasions and a monitoring window size that the user equipment monitors for feedback for the contention based transmission as indicated by block 600; determining, by a user equipment of a wireless network, whether an amount of user data can be transmitted on one or more of contention based transmission occasions as indicated by block 602; performing one or more contention based transmissions during the one or more of the contention based transmission occasions based at least on the determination as indicated by block 604; and monitoring for feedback for each of the performed contention based transmissions based at least on the monitoring window size, wherein the feedback may comprise feedback for each contention based transmission in a feedback mapping window as indicated by block 606.

The receiving may include receiving a maximum number of consecutive contention based transmission occasions that the user equipment is allowed to utilize for performing the one or more contention based transmissions; and the determining may be based at least on the maximum number.

The method may further include: receiving feedback for each contention based transmission performed by the user equipment during the monitoring.

The feedback may include at least one of: feedback for at least two contention based transmissions performed by the user equipment on different contention based transmission occasions, and feedback for at least two contention based transmissions performed by different user equipments.

The feedback for the at least two contention based transmissions performed by different user equipments may correspond to a same contention based transmission occasion.

The feedback may be received on a specific subframe, and the feedback may include feedback for each of the plurality of contention based transmission occasions.

The feedback may include feedback for a contention based transmission occasion in which the user equipment did not perform a contention based transmission.

The feedback may include a contention based radio network temporary identifier (CB-RNTI) corresponding to the user equipment and at least one other user equipment.

The feedback may include at least one of: at least one list of preambles and/or user identifiers, and at least one bitmap comprising a plurality bits, wherein one bit may be mapped to each of the plurality of contention based transmission occasions.

The feedback may include a plurality of bitmaps and a single list, wherein each of the bitmaps: corresponds to a different preamble and/or different user identifier, and may be indicative of contention based transmission occasions within which a contention based transmission was received.

The feedback may include a single bitmap and a plurality of lists, wherein the single bitmap may be indicative of a contention based transmission occasions within which a contention based transmission was received.

The method may include: determining the feedback for the contention based transmission performed by the user equipment based on the at least one list and the least one preamble.

The feedback may begin at least one subframe after the subframe where the respective contention based transmission is transmitted.

According to another embodiment, a computer program comprising program code for executing the method according to any of paragraphs [0070]-[0082] is provided. The computer program may be a computer program product comprising a non-transitory computer-readable medium bearing computer program code embodied therein for use with a computer.

In another example embodiment an apparatus is provided, the apparatus comprising: at least one processor; and at least one memory including computer program code, the at least one memory and the computer program code may be configured, with the at least one processor, to cause the apparatus to perform at least: receiving, by a user equipment from a wireless network, an indication of a plurality of contention based transmission occasions and a monitoring window size that the user equipment monitors for feedback for the contention based transmission; determining, by a user equipment of a wireless network, whether an amount of user data can be transmitted on one or more of contention based transmission occasions; performing one or more contention based transmissions during the one or more of the contention based transmission occasions based at least on the determination; and monitoring for feedback for each of the performed contention based transmissions based at least on the monitoring window size, wherein the feedback comprises feedback for each contention based transmission in a feedback mapping window. The at least one memory and the computer program code may be further configured to, with the at least one processor, cause the apparatus to perform the method according to any of paragraphs [0070]-[0082].

In another example embodiment, an apparatus is provided comprising: means for receiving, by a user equipment from a wireless network, an indication of a plurality of contention based transmission occasions and a monitoring window size that the user equipment monitors for feedback for the contention based transmission; determining, by a user equipment of a wireless network, whether an amount of user data can be transmitted on one or more of contention based transmission occasions; performing one or more contention based transmissions during the one or more of the contention based transmission occasions based at least on the determination; and monitoring for feedback for each of the performed contention based transmissions based at least on the monitoring window size, wherein the feedback comprises feedback for each contention based transmission in a feedback mapping window. The apparatus may include means for executing the method according to any of paragraphs [0070]-[0082].

Without in any way limiting the scope, interpretation, or application of the claims appearing below, a technical effect of one or more of the example embodiments disclosed herein is that multiple CB transmission from the same UE or different UEs could be provided by a single feedback thus saving signaling overhead.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

eNB (or eNodeB) evolved Node B (e.g., an LTE base station)
CB Contention Based
I/F interface
LTE long term evolution
MME mobility management entity
NCE network control element
NR New Radio
N/W network
RRC Radio Resource Control
RRH remote radio head
Rx receiver
SGW serving gateway
TB Transport Block
TBS Transport block size
Tx transmitter
UE user equipment (e.g., a wireless, typically mobile device)
UL uplink

The invention claimed is:

1. An apparatus, comprising:
    at least one processor; and
    at least one non-transitory memory including computer program code, wherein the at least one memory and the computer program code are configured to, with the at least one processor, cause the apparatus at least to:
        receive from a wireless network an indication of a plurality of contention based transmission occasions and a monitoring window size to monitor for feedback for the contention based transmission within a feedback mapping window;
        determine whether an amount of user data can be transmitted on one or more of the plurality of contention based transmission occasions;
        perform one or more contention based transmissions during the one or more of the plurality of contention based transmission occasions based at least on the determination; and
        monitor for feedback for each of the performed contention based transmissions based at least on the monitoring window size, wherein the feedback comprises feedback for each contention based transmission in the feedback mapping window.

2. The apparatus of claim 1, wherein the receiving further comprises receiving a maximum number of consecutive contention based transmission occasions that the apparatus is allowed to utilize for performing the one or more contention based transmissions; and the determining is based at least on the maximum number.

3. The apparatus of claim 1, wherein the at least one memory and the computer program code are further configured to, with the at least one processor, cause the apparatus to receive, during the monitoring, feedback for each contention based transmission performed during the feedback mapping window.

4. The apparatus of claim 1, wherein the feedback comprises at least one of:
    feedback for at least two contention based transmissions performed by the apparatus on different contention based transmission occasions, or
    feedback for at least two contention based transmissions performed by different user equipments.

5. The apparatus of claim 4, wherein the feedback for the at least two contention based transmissions performed by different user equipments corresponds to a same contention based transmission occasion.

6. The apparatus of claim 1, wherein the feedback is received on a specific subframe, and wherein the feedback comprises feedback for each of the plurality of contention based transmission occasions.

7. The apparatus of claim 1, wherein the feedback comprises feedback for a contention based transmission occasion in which the user equipment did not perform a contention based transmission.

8. The apparatus as in claim 1, wherein the feedback comprises a contention based radio network temporary identifier (CB-RNTI) corresponding to the apparatus and at least one separate user equipment.

9. The apparatus of claim 1, wherein the feedback comprises:
    at least one list of preambles and/or user identifiers, and
    at least one bitmap comprising a plurality of bits, wherein one bit is mapped to each of the plurality of contention based transmission occasions.

10. The apparatus of claim 1, wherein the feedback comprises at least one of:
    a plurality of bitmaps and a single list, wherein each of the bitmaps corresponds to a different preamble and/or different user identifier, and is indicative of contention based transmission occasions within which a contention based transmission was received; or
    a single bitmap and a plurality of lists, wherein each of the lists corresponds to a different transmission occasion, and is indicative of a list of preambles and/or user identifiers for which a contention based transmission was received.

11. The apparatus of claim 10, wherein the at least one memory and the computer program code are further configured to, with the at least one processor, cause the apparatus to determine the feedback for the contention based transmission performed by the apparatus based on the at least one list and the at least one preamble and/or user identifier.

12. The apparatus of claim 1, wherein the feedback begins at least one subframe after the subframe where the respective contention based transmission is transmitted.

13. The apparatus of claim 1, wherein the feedback comprises at least one bitmap comprising a plurality of bits, wherein one bit is mapped to each of the plurality of contention based transmission occasions.

14. An apparatus, comprising:
   at least one processor; and
   at least one non-transitory memory including computer program code, wherein the at least one memory and the computer program code are configured to, with the at least one processor, cause the apparatus at least to:
      configure a plurality of contention based transmission occasions for each of a plurality of user equipments, and a monitoring window size to be used by the plurality of user equipments to monitor for feedback of contention based transmissions in a feedback mapping window;
      receive, from at least one of the user equipments, one or more contention based transmission corresponding to one or more of the plurality of contention based transmission occasions configured for the at least one of the user equipments;
      generate feedback for the received one or more contention based transmissions, wherein the feedback comprises feedback for each contention based transmission received in the feedback mapping window having the configured window size; and
      transmit the feedback to the plurality of user equipments.

15. The apparatus of claim 14, wherein the configuring further comprises:
   configuring a maximum number of consecutive contention based transmission occasions that a given user equipment is allowed to utilize for transmissions.

16. The apparatus of claim 14, wherein the feedback comprises at least one of:
   feedback for at least two contention based transmissions received from a same user equipment on different contention based transmission occasions, or
   feedback for at least two contention based transmissions received from different user equipments.

17. The apparatus of claim 16, wherein the at least two contention based transmissions received from different user equipments are received on a same or different contention based transmission occasion within the same feedback mapping window.

18. The apparatus of claim 14, wherein the feedback is transmitted on a specific subframe, and wherein the feedback comprises feedback for every contention based transmission occasion within the feedback mapping window.

19. A method, comprising:
   receiving, by a user equipment from a wireless network, an indication of a plurality of contention based transmission occasions and a monitoring window size that the user equipment monitors for feedback for the contention based transmission in a feedback mapping window;
   determining, by the user equipment, whether an amount of user data can be transmitted on one or more of the plurality contention based transmission occasions;
   performing one or more contention based transmissions during the one or more of the plurality of contention based transmission occasions based at least on the determination; and
   monitoring for feedback for each of the performed contention based transmissions based at least on the monitoring window size, wherein the feedback comprises feedback for each contention based transmission in the feedback mapping window.

20. The method of claim 19, wherein the feedback comprises at least one of:
   a plurality of bitmaps and a single list, wherein each of the bitmaps corresponds to a different preamble and/or different user identifier, and is indicative of contention based transmission occasions within which a contention based transmission was received; or
   a single bitmap and a plurality of lists, wherein each of the lists corresponds to a different transmission occasion, and is indicative of a list of preambles and/or user identifiers for which a contention based transmission was received.

21. The method of claim 20, wherein the method further comprises: determining the feedback for the contention based transmission performed by the user equipment based on the at least one list and the at least one preamble and/or user identifier.

* * * * *